(12) United States Patent
Parks et al.

(10) Patent No.: US 11,433,897 B2
(45) Date of Patent: Sep. 6, 2022

(54) METHOD AND APPARATUS FOR DETERMINATION OF OPTIMAL CRUISING LANE IN AN ASSISTED DRIVING SYSTEM

(71) Applicant: GM GLOBAL TECHNOLOGY OPERATIONS LLC, Detroit, MI (US)

(72) Inventors: Jeffrey S. Parks, Ann Arbor, MI (US); Paul A. Adam, Milford, MI (US); Gabriel T. Choi, Novi, MI (US); Braden J. Swantick, Canton, MI (US); Namai P. Kumara, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 16/817,681

(22) Filed: Mar. 13, 2020

(65) Prior Publication Data
US 2021/0284162 A1 Sep. 16, 2021

(51) Int. Cl.
| | |
|---|---|
| *B60W 10/06* | (2006.01) |
| *B60W 10/184* | (2012.01) |
| *B60W 10/20* | (2006.01) |
| *B60W 30/12* | (2020.01) |
| *B60W 30/14* | (2006.01) |
| *B60W 30/18* | (2012.01) |
| *B60W 40/04* | (2006.01) |
| *B60W 50/08* | (2020.01) |
| *B60W 60/00* | (2020.01) |
| *G05D 1/02* | (2020.01) |

(52) U.S. Cl.
CPC ...... *B60W 30/18163* (2013.01); *B60W 40/04* (2013.01); *G05D 1/0212* (2013.01); *G05D 2201/0212* (2013.01); *G05D 2201/0213* (2013.01)

(58) Field of Classification Search
CPC .......... B60W 30/18163; B60W 40/04; B60W 40/09; B60W 30/0956; B60W 2556/50; B60W 2556/65; B60W 2550/0953; B60W 2050/0031; G05D 1/0212; G05D 2201/0213; G05D 2201/0212; G05D 1/0214; G06N 20/00
USPC .......................................................... 701/26
See application file for complete search history.

(56) References Cited

U.S. PATENT DOCUMENTS

| | | | |
|---|---|---|---|
| 2017/0076598 A1* | 3/2017 | Scofield | G08G 1/096725 |
| 2018/0178801 A1* | 6/2018 | Hashimoto | G05D 1/0088 |
| 2018/0204463 A1* | 7/2018 | Khalifeh | B60W 50/10 |
| 2021/0009133 A1* | 1/2021 | McNew | B60W 40/09 |

(Continued)

*Primary Examiner* — Abby Y Lin
*Assistant Examiner* — Hossam M Abd El Latif
(74) *Attorney, Agent, or Firm* — Lorenz & Kopf LLP (57) ABSTRACT

The present application relates to a method and apparatus for controlling an ADAS equipped vehicle including a sensor configured for determining a first distance to a first proximate vehicle and a second distance to a second proximate vehicle, a user input operative to receive a user preference, a memory operative to store a map data, a processor operative to generate a current lane score and an adjacent lane score in response to the first distance, the second distance, the user preference, and the map data, the processor being further operative to generate a lane change control signal in response to the adjacent lane score exceeding the current lane score and a vehicle controller operative to perform a lane change operation from a current lane to an adjacent lane in response to the lane change control signal.

20 Claims, 5 Drawing Sheets

(56) References Cited

U.S. PATENT DOCUMENTS

2021/0053570 A1* 2/2021 Akella ................. G06V 20/584
2021/0272462 A1* 9/2021 Yang .................... G05D 1/0212

* cited by examiner

METHOD AND APPARATUS FOR DETERMINATION OF OPTIMAL CRUISING LANE IN AN ASSISTED DRIVING SYSTEM

BACKGROUND

The present disclosure relates generally to programming motor vehicle control systems. More specifically, aspects of this disclosure relate to systems, methods and devices to identify an optimal cruising lane for use by an advanced driver-assistance system equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as lance centering control, cruise control, adaptive cruise control, and parking assistance systems correspond to lower automation levels, while true "driverless" vehicles correspond to higher automation levels.

Adaptive cruise control systems have been developed where not only does the system maintain the set speed and remain centered within the current lane, but also will automatically slow the vehicle down in the event that a slower moving preceding vehicle is detected using various sensors such as radar and cameras. Automated lane change may be sub-feature of lane centering where a vehicle may initiate a lane change automatically in response to slower moving vehicles, traffic, and other obstacles. Typically, a home lane must be determined from which the lane centering control feature is operative from. As a driver may initiate the lane centering control feature immediately after entering highway, on an entrance ramp, or on another highway, the optimal home lane may not be the lane in which the driver initiated the lane centering control feature. It would be desirable to overcome these problems to provide a method and apparatus for determining a cruising lane for lane centering control to use as its home lane in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor configured for determining a first distance to a first proximate vehicle and a second distance to a second proximate vehicle, a user input operative to receive a user preference, a memory operative to store a map data, a processor operative to receive the generate a current lane score and an adjacent lane score in response to the first distance, the second distance, the user preference, and the map data, the processor being further operative to generate a lane change control signal in response to the adjacent lane score exceeding the current lane score, and a vehicle controller operative to perform a lane change operation from a current lane to an adjacent lane in response to the lane change control signal.

In accordance with another aspect of the present invention wherein the processor is further operative to generate the lane change control signal in response to the adjacent lane score exceeding the current lane score by a threshold value.

In accordance with another aspect of the present invention wherein the processor is further operative to generate the lane change control signal in response to a time duration since a prior lane change operation exceeding a threshold time duration.

In accordance with another aspect of the present invention wherein the processor is operative to generate the current lane score and the adjacent lane score in response to a completion of a lane change operation.

In accordance with another aspect of the present invention wherein the user preference is a vehicle speed.

In accordance with another aspect of the present invention wherein the processor is operative to generate the current lane score and the adjacent lane score in response to a detection of a slower moving preceding vehicle in a current lane.

In accordance with another aspect of the present invention wherein the processor is operative to generate the current lane score and the adjacent lane score in response to a lane change request received via the user input.

In accordance with another aspect of the present invention wherein the processor is operative to generate the current lane score and the adjacent lane score in response to a lane change request received via an ADAS algorithm.

In accordance with another aspect of the present invention, a method performed by a processor including generating an object map of an area proximate to a host vehicle, receiving a map data corresponding to the area proximate to the host vehicle, generating a current lane score and a proximate lane score in response to the object map and the map data, generating a lane change control signal in response to the adjacent lane score exceeding the current lane score, and performing a lane change operation from a current lane to an adjacent lane in response to the lane change control signal.

In accordance with another aspect of the present invention wherein the lane change control signal is generated in response to the adjacent lane score exceeding the current lane score by a threshold value.

In accordance with another aspect of the present invention wherein the lane change control signal is generated in response to a time duration since a prior lane change operation exceeding a threshold time duration In accordance with another aspect of the present invention wherein the current lane score and the adjacent lane score are generated in response to a completion of a lane change operation.

In accordance with another aspect of the present invention wherein the current lane score and the adjacent lane score are generated in response to a user vehicle speed selection.

In accordance with another aspect of the present invention wherein the current lane score and the adjacent lane score are generated in response to a detection of a slower moving preceding vehicle in a current lane.

In accordance with another aspect of the present invention wherein the current lane score and the adjacent lane score are generated in response to a lane change request received via the user input.

In accordance with another aspect of the present invention wherein the current lane score and the adjacent lane score are generated in response to a lane change request received via an ADAS algorithm.

In accordance with another aspect of the present invention wherein the current lane score and the adjacent lane score are generated in response to a user generated lane change request.

In accordance with another aspect of the present invention wherein the current lane score and the adjacent lane score are generated in response to at least one of a lane observed speed, a density of roadway entrances and exits, a density of traffic observed in the current lane, a driver set speed, a navigational route, and a driver preferred lane.

In accordance with another aspect of the present invention, an advanced driver assistance system for controlling a host vehicle including an input for receiving a request to determine an optimal cruising lane, a processor operative to generate a current lane score and an adjacent lane score in response to the input, wherein the current lane score and the adjacent lane score are determined in response to an object map of an area proximate to the host vehicle and a map data of the area proximate to the host vehicle, and for generating a lane change control signal in response to the adjacent lane score exceeding the current lane score, and a vehicle controller for performing a lane change operation from a current lane to an adjacent lane in response to the lane change control signal.

In accordance with another aspect of the present invention wherein the current lane score and the adjacent lane score are generated in response to at least one of a lane observed speed, a density of roadway entrances and exits, a density of traffic observed in the current lane, a driver set speed, a navigational route, and a driver preferred lane.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
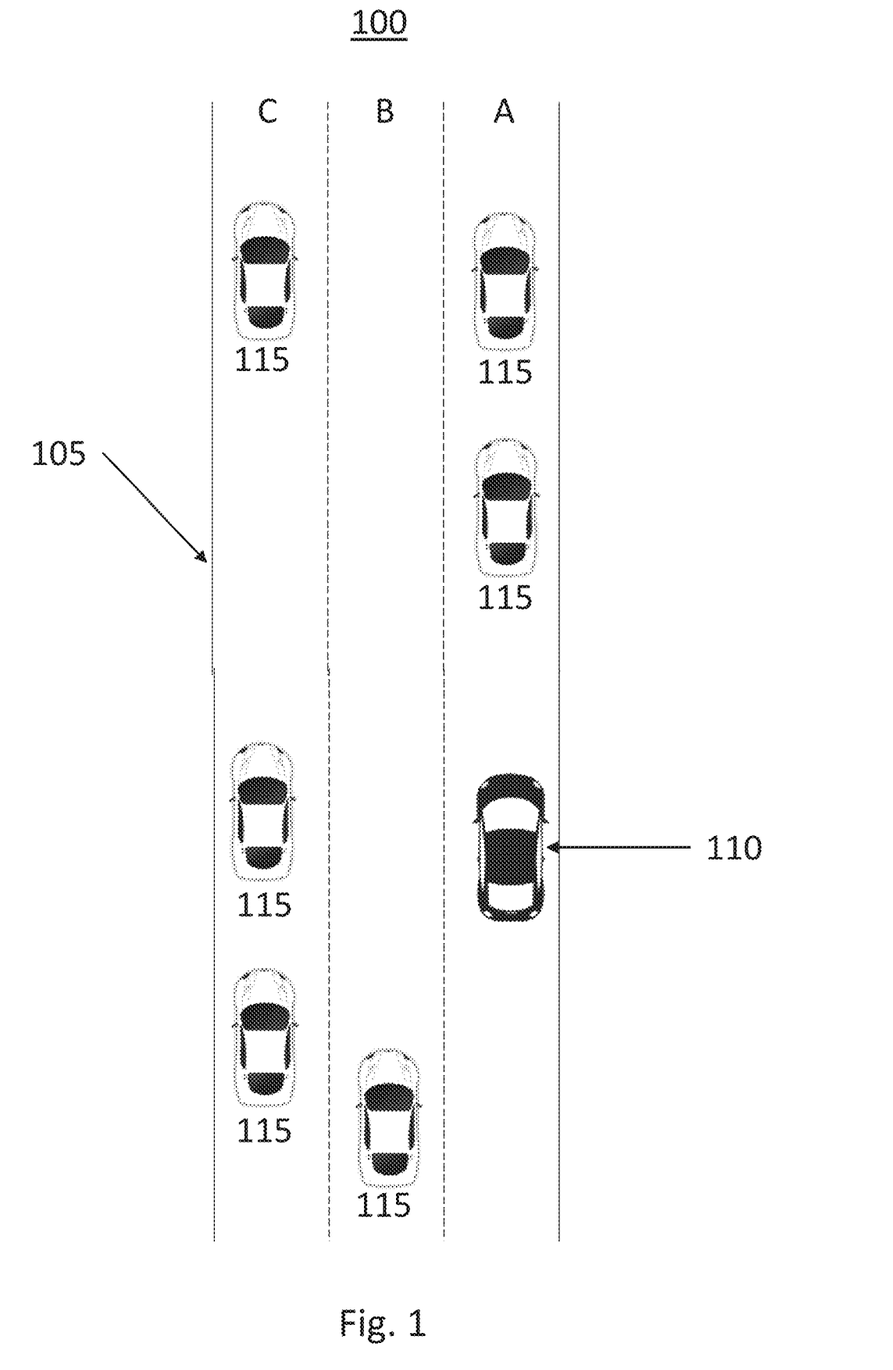
FIG. 1 shows an operating environment for determination of optimal cruising lane for a lane centering control operation in an ADAS equipped motor vehicle according to an exemplary embodiment.

FIG. 1 schematically illustrates an operating environment 100 for determination of optimal cruising lane for a lane centering control (LCC) operation in an ADAS equipped motor vehicle 110. In this exemplary embodiment of the present disclosure, the host vehicle 110 is driving on a multilane roadway 105 along with a plurality of proximate vehicles 115 also navigating the roadway 105.

In this exemplary embodiment, the host vehicle 110 is operative to perform an LCC ADAS operation. In an automated LCC system, a cruising lane is selected as the home lane of the host vehicle. However, the optimal cruising lane may not be the lane in which the driver initiates the LCC feature. This exemplary system and method are operative to determine the home lane for the LCC ADAS operation based on road characteristics from a high definition map, host and proximate vehicle parameters, observed traffic parameters, and interaction with driver.

In an exemplary embodiment, the host vehicle 110 may enter a three lane highway from the right side via an on ramp. In this example, the host vehicle may then be traveling in the rightmost lane (A). A lane change decision may then be initiated either by the driver or an ADAS controller. The lane change decision may be triggered in response to a driver input or in response to slower moving preceding traffic in the current lane. The exemplary system may then perform a longitudinal lane change planning algorithm to generate a longitudinal navigational route and a lateral lane change planning algorithm to generate a lateral navigational route. The longitudinal navigational route may then be executed in response to a longitudinal velocity controller and the lateral navigational route may then be executed in response to a lateral velocity controller.

After execution of the longitudinal and lateral lane change planning algorithms the exemplary system may be operative to determine an optimal cruising lane, or home lane, in which the host vehicle 110 may optimally travel. The system may use methodology that determines an optimal highway cruising lane by considering inputs from high definition map data, such as upcoming entrances, exits, splits and merges, driver input, such as driver set speed, levelized cost of driving (LCoD) commands and initial lane selection, proximate vehicle data, such as position, velocity, acceleration, vehicle type, and host vehicle 110 parameters, such as velocity, battery state of charge (SOC), and engine operation mode. The methodology may use the input data to determine an optimal cruising lane. For example, in the exemplary environment 110, the methodology may be operative to determine that lane B of the multilane roadway 105 is a preferable lane over lanes A and C due to the low number of vehicles in lane B, the velocity of the host vehicle 110, the velocity of proximate vehicles, and the destination of the host vehicle.

In one exemplary embodiment, the system may initiate a lane change from a first lane (A) to a second lane (B). In response to the lane change, the system is then operative to determine an optimal cruising lane from the first lane (A) or the second lane (B). If the first lane is determined to be the optimal cruising lane, the system is operative to perform a second lane change operation to return the host vehicle 110 to the original first lane (A) after any lane obstruction in the first lane (A), such as preceding vehicles, have been cleared. If the second lane (B) is determined to be an optimal cruising lane over the first lane (A), the system would be operative to keep the host vehicle 110 in the second lane (B) after the lane obstructions in the first lane (A) have been cleared.

Figure 2:
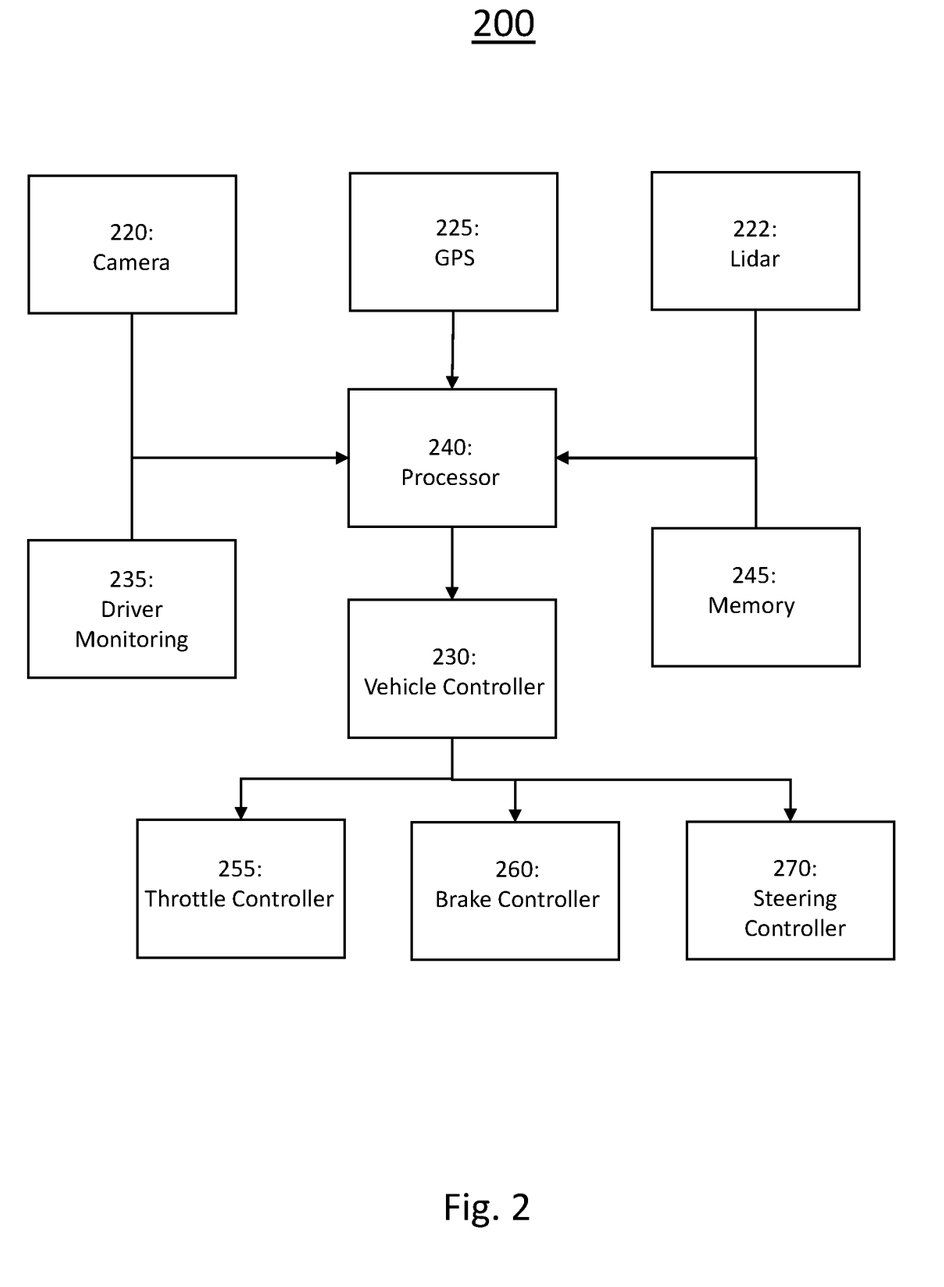
FIG. 2 shows a block diagram illustrating a system for determination of optimal cruising lane for a lane centering control operation in an ADAS equipped motor vehicle according to an exemplary embodiment.

Turning now to FIG. 2, a block diagram illustrating an exemplary implementation of a system 200 for determination of optimal cruising lane for an LCC operation in an ADAS equipped motor vehicle is shown. The system 200 includes a processor 240, a camera 220, a Lidar 222, a global positioning system (GPS) 225, a driver monitoring system (DMS) 235, a memory 245, a vehicle controller 230 a throttle controller 255, a brake controller 260 and a steering controller 270.

While performing an exemplary ADAS operation, the system is operative to use various sensors such as a camera 220 and Lidar 222 capable of identifying and locating individual external objects. Sensor fusion algorithms provide accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. These objects may then be bounded and identified as an undesirable driving area and stored in a memory or added to a reference object map for the ADAS.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected off of the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The GPS sensor 225 may be operative to receive a plurality of time stamped satellite signals including the location data of a transmitting satellite. The GPS then uses this information to determine a precise location of the GPS sensor 225. The processor 240 may be operative to receive the location data from the GPS sensor 225 and/or store this location data to the memory 245. The memory 245 may be operative to store map data for use by the processor 220.

The DMS 235 is operative to assess a driver engagement level during operation of the vehicle. The DMS may be operative to monitor the driver engagement via a DMS camera and image recognition techniques. In particular, the driver engagement level may be determined in response to a driver's eye position and estimated location of the driver's gaze determined in response to an image captured by a DMS camera or the like.

In this exemplary embodiment, the processor 240 is operative to initiate an ADAS algorithm by generating a control signal for coupling to the vehicle controller 230 or by performing the ADAS algorithm. The ADAS operation may be an adaptive cruise control operation, a lane centering operation or the like. The processor 240 may be further operative to perform the DMS operation or may receive information from the DMS 235. The DMS operation is operative to monitor the driver engagement where driver engagement may be determined in response to a driver's eye position determined in response to an image captured by a DMS camera or the like. Alternatively, the DMS may monitor steering wheel feedback, head position, driver's seat pressure switches or the like.

The processor 240 is further operative to receive data via the camera 220, Lidar 222, GPS 225, memory 245 and other inputs, such as wireless network connections and the like. The processor 240 may then be operative to generate an object map for mapping object data in an area proximate to the host vehicle. Object data may include object location, object dimensions, object velocity, as well as map data such as location and number of lanes, roadway entrances and exits, etc. The processor 240 may be further operative to determine a host vehicle location, host vehicle velocity, host vehicle navigation plan and host vehicle driver preferences, such as preferred lane, driver set speed, etc.

The processor 240 is further operative to determine if a current lane is an optimal cruising lane. The processor may use the received data to generate a lane score for each of the available lanes on the current roadway. In one exemplary embodiment, the processor 240 may generate a lane score for the current lane and any adjacent lanes. In another exemplary embodiment, the processor 240 may generate a lane score for any additional available lanes. Lane scores may be generated in response to lane observed speed, density of entrances and exits, Density of traffic observed in lane, driver set speed, navigational route, and driver preferred lane. In addition, lane scores may be modified in response to trailering operation or number of lanes in the current vehicle way. The processor 240 may further generate control signals to execute the lane change operation in response to the current lane not being an optimal cruising lane.

The vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
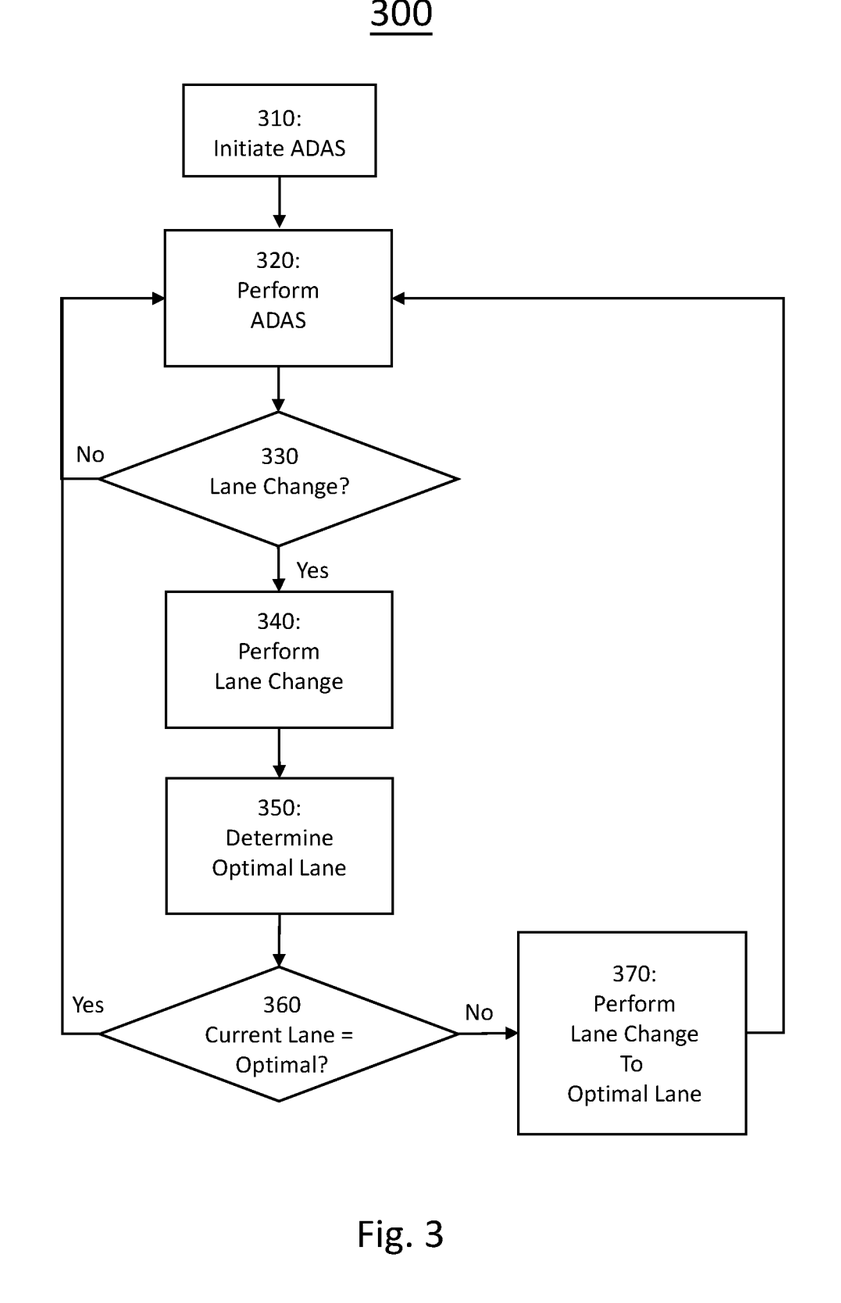
FIG. 3 shows a flow chart illustrating a method for determination of optimal cruising lane for a lane centering control operation in an ADAS equipped motor vehicle according to another exemplary embodiment.

Turning now to FIG. 3, a flow chart illustrating an exemplary implementation of a method 300 for determination of optimal cruising lane for an LCC operation in an ADAS equipped motor vehicle is shown. The method is first operative to engage 310 an ADAS algorithm. The ADAS operation may be an adaptive cruise control operation, a lane centering operation or the like. The ADAS may be engaged in response to a user input via a user interface or may be initiated by a vehicle controller in response to another ADAS operation.

In response to the engagement of the ADAS operation, the method is next operative to perform 320 the ADAS operation. The ADAS controller may be operative to collect data to determine the location of proximate vehicles and to receive map data related to the current roadway, such as number of lanes, entrances and exits, speed limits, traffic indicators and the like. The ADAS may use this data to generate an object map to track the locations of objects proximate to the host vehicle. During performance of the ADAS operation, such as a LCC operation, the DMS may be operative to monitor the driver engagement. The ADAS may be operative to provide a driver warning and/or disengage the ADAS operation in response to a determination that the is an insufficient level of driver engagement.

The method is next operative to determine 330 if a lane change request has been received. The lane change request may be initiated by a vehicle operator request, such as activation of a turn signal or voice command or may be initiated by a an ADAS controller in response to a determination by an assisted driving algorithm.

The method is next operative to perform 340 the lane change in response to the lane change request. The lane change may be executed by a vehicle controller in communication with a steering controller, throttle controller and brake controller. A lane change coordinator, which may be part of an ADAS controller is operative to perform a longitudinal lane change planning algorithm and a lateral lane change planning algorithm. The longitudinal lane change planning algorithm may be operative to generate a longitudinal lane change navigational path in response to high definition map data, data from vehicle sensors, wirelessly received data, such as weather and prior vehicle data from other vehicles, and user input, such as preferences and the like. Likewise, the lateral lane change planning algorithm may be operative to generate the lateral lane change navigational path in response to the high definition map data, data from vehicle sensors, wirelessly received data, such as weather and prior vehicle data from other vehicles, and user input, such as preferences and the like.

The method is next operative to perform 340 the lane change according to the lateral lane change navigational path and the longitudinal lane change navigational path using the vehicle controller. The vehicle controller may include a longitudinal velocity controller and/or a lateral steering and lateral velocity controller. The vehicle controller, longitudinal velocity controller and/or lateral steering and lateral velocity controller may be operative to couple control signals and data to host vehicle steering controllers, host vehicle throttle controllers, and host vehicle brake controllers to move the vehicle from the original lane to a destination lane. The lateral lane change navigational route and the longitudinal lane change navigational route may be continuously updated during the lane change operation with vehicle sensor data used to monitor the activities of proximate vehicles and other proximate objects.

In this exemplary embodiment, after the lane change has been executed to a destination lane, the method is next operative to determine 350 an optimal lane. The determination of the optimal lane is made to determine an optimal cruising lane for the host vehicle. For example, if the method determines that the destination lane is an optimal cruising lane, the host vehicle may remain in the destination lane after the lane change is executed and any prior obstruction, such as a slow-moving vehicle, has been cleared in the original lane. Alternatively, of the method determines that the original lane is an optimal cruising lane, the ADAS system may execute another lane change back to the original lane after the obstruction in the original lane is cleared.

In order to determine the optimal cruising lane, the method is first operative to calculate a lane score for each of the available lanes. In this exemplary embodiment, the method may calculate a lane score for the original lane and a lane score for the destination lane. A lane score may be calculated for all available lanes, such as all four lanes eastbound on an eight lane highway or may be calculated for just the original lane and the destination lane during a lane change operation. The lane score may be determines by a lane score algorithm using factors such as: lane observed speed—driver set speed, density of entrances and exits, density of traffic in observed lane, driver set speed—speed limit from map data, navigational route, and driver preferred lane. In an exemplary embodiment, the method may be operative to weight the factors used by the lane scoring algorithm in response to a trailering modifier or a number of lanes modifier. For example, if the host vehicle is also performing a trailering operation, the method may weight the density of entrances/exits higher and the density of traffic observed in the lane lower. The factors used by the lane scoring algorithm may include an observed speed multiplier, an intersection density multiplier, a traffic density multiplier, a speed limit multiplier, a navigation multiplier, a driver preferred lane multiplier, a current lane factor and a headway obstruction subtractor.

The method is next operative to determine 360 if the current lane is the optimal lane. In determining if the current lane is the optimal lane, the method is first operative to determine if the difference in lane score of another available lane over the current lane exceeds a threshold value making the lane change worthwhile. For example, if an available lane score only slightly exceeds the current lane score, performing a lane change may not achieve a perceivable difference and therefore not be worthwhile. If the difference in lane scores exceeds the threshold, the method may next be operative to determine if a threshold time interval since a previous lane change has been exceeded. For example, to avoid a vehicle continuously changing lanes, the method may establish that a lane change can only be performed at a maximum every 30 seconds. After the lane score is calculated for each of the available lanes, the method is then operative to determine if a lane change is desirable.

If the current lane is the optimal lane, the method is then operative to return to performing 320 the ADAS algorithm, such as to perform an LCC operation. If, for example, the current lane is not the optimal lane and the time duration since the last lane change exceeds the threshold time interval, the method may then be operative to perform 370 the lane change to the optimal lane and return to performing 320 the ADAS.

Figure 4:
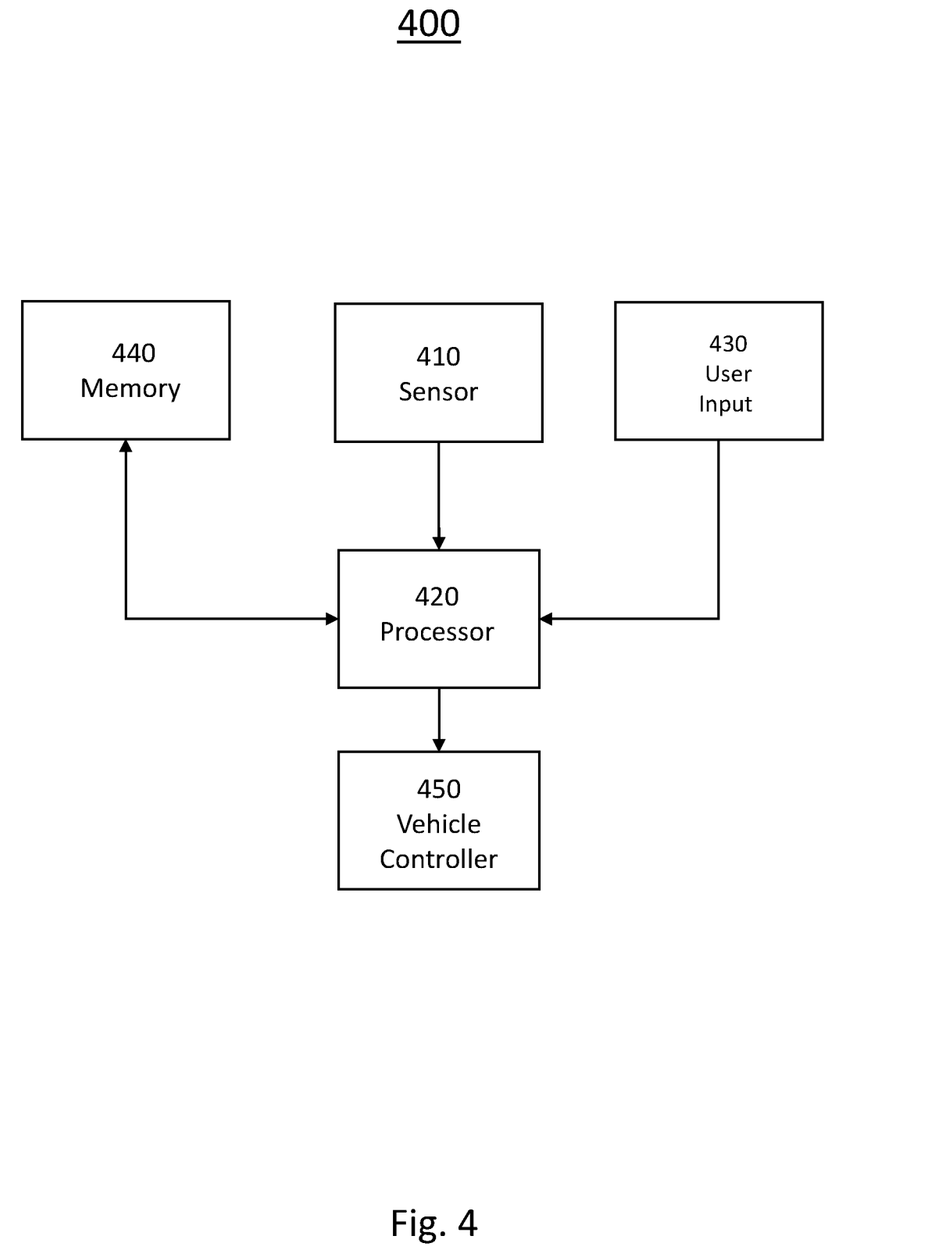
FIG. 4 shows a block diagram illustrating a system for determination of optimal cruising lane for a lane centering control operation in an ADAS equipped motor vehicle according to another exemplary embodiment.

Turning now to FIG. 4, a block diagram illustrating another exemplary implementation of a system 400 for prevention of unintended lane change maneuver in an ADAS equipped motor vehicle is shown. The exemplary system 400 may include a sensor 410, a processor 420 a user input 430 a memory 440 and a vehicle controller 450.

In this exemplary embodiment, the sensor 410 configured for determining a first distance to a first proximate vehicle and a second distance to a second proximate vehicle. The sensor 410 may be a Lidar, a radar, a camera, such as a stereoscopic camera with image processing capabilities, or other distance determining sensor. The sensor 410 in this exemplary embodiment, is not restricted to one sensor and may include a fusion of output data from multiple sensors.

The exemplary system 400 may further include a user input 430 operative to receive a user preference. The user input 430 may be a touch screen display operative to display a graphical user interface and receive a user input via a touch sensitive surface or touchpad. Alternatively, the user interface 430 may include a microphone for receiving a user input via a voice command or a turn signal indicator wherein the user input is generated in response to a user, such as a vehicle operation, positioning the turn signal indicator. For example, the vehicle operator may position the turn signal indicator to indicate a left turn. This indication of the left turn may then be used to initiate a lane change operation to a left adjacent lane. In one exemplary embodiment, the user preference may be a vehicle speed.

The system 400 may further include a memory operative to store a map data, such as a high definition map data. The map data may include information such as lane positions, stationary object locations, elevations, roadway inclines, static traffic indicators, roadway exits and entrances and the like. The map data may be received from a service provider via a wireless network connection such as a cellular network or the like.

The system may further include a vehicle controller 450 operative to perform a lane change operation from a current lane to an adjacent lane in response to the lane change control signal. The vehicle controller 450 may be a single controller operative to communicate to vehicle systems, such as an ADAS processor via a Controller Area Network (CAN) bus, and/or may be operative to communicate steering controller, a brake controller, and a throttle controller. In an exemplary embodiment, the vehicle controller 450 may receive a longitudinal navigational route from a longitudinal lane change planning algorithm performed by an ADAS processor and a lateral navigational route from a lateral lane change planning algorithm performed by the ADAS processor. The vehicle controller 450 may then execute a longitudinal velocity control algorithm in response to the longitudinal navigational route and a lateral control algorithm in response to the lateral navigational route.

The system may further include a processor 420, such as a microprocessor, a digital signal processor, or other discrete hardware based computing processor operative to receive the data and to generate a current lane score and an adjacent lane score in response to the first distance, the second distance, the user preference, and the map data. The processor 420 may be further operative to generate a lane change control signal in response to the adjacent lane score exceeding the current lane score. In an exemplary embodiment the processor 420 may be further operative to generate the lane change control signal in response to the adjacent lane score exceeding the current lane score by a threshold value.

In another exemplary embodiment the processor 420 may be further operative to generate the lane change control signal in response to a time duration since a prior lane change operation exceeding a threshold time duration. In another exemplary embodiment the processor 420 may be operative to generate the current lane score and the adjacent lane score in response to a completion of a lane change operation. In another exemplary embodiment the processor 420 may be operative to generate the current lane score and the adjacent lane score in response to a detection of a slower moving preceding vehicle in a current lane. In another exemplary embodiment the processor 420 may be operative to generate the current lane score and the adjacent lane score in response to a lane change request received via the user input. Alternatively, the processor 420 may be operative to generate the current lane score and the adjacent lane score in response to a lane change request received via an ADAS algorithm.

In an exemplary embodiment, the apparatus may be an advanced driver assistance system for controlling a host vehicle including an input for receiving a request to determine an optimal cruising lane. The advanced driver assistance system may further include a processor operative to generate a current lane score and an adjacent lane score in response to the input, wherein the current lane score and the adjacent lane score are determined in response to an object map of an area proximate to the host vehicle and a map data of the area proximate to the host vehicle, and for generating a lane change control signal in response to the adjacent lane score exceeding the current lane score. In this exemplary embodiment, the current lane score and the adjacent lane score are generated in response to at least one of a lane observed speed, a density of roadway entrances and exits, a density of traffic observed in the current lane, a driver set speed, a navigational route, and a driver preferred lane. The advanced driver assistance system may further include a vehicle controller for performing a lane change operation from a current lane to an adjacent lane in response to the lane change control signal.

Figure 5:
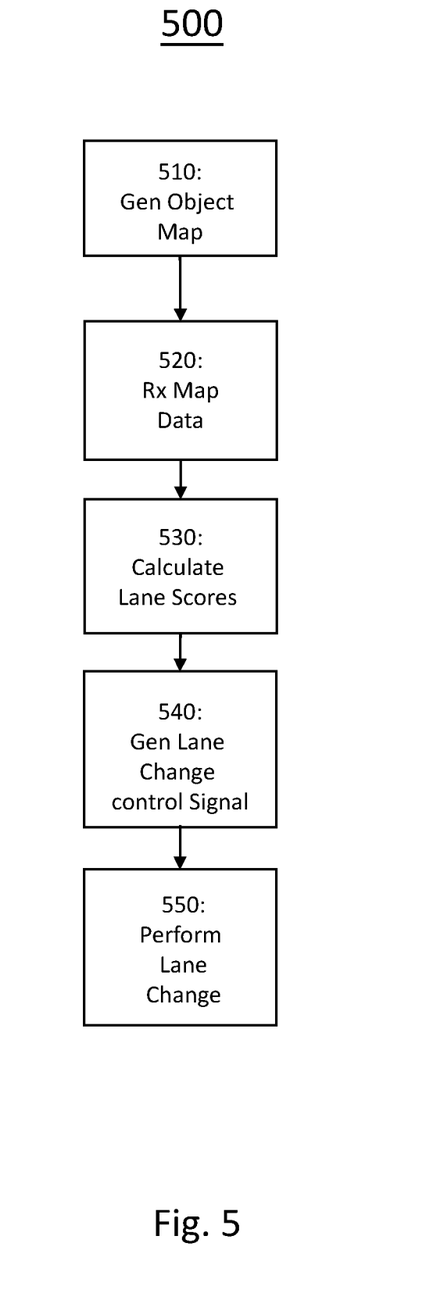
FIG. 5 shows a flow chart illustrating a method for determination of optimal cruising lane for a lane centering control operation in an ADAS equipped motor vehicle according to another exemplary embodiment.

Turning now to FIG. 5, a flow chart illustrating an exemplary implementation of a system 500 for prevention of unintended lane change maneuver in an ADAS equipped motor vehicle is shown. The method may be configured for generating 510 an object map of an area proximate to a host vehicle. The object map may be generated in response to sensor data indicative of proximate objects, vehicle to vehicle (V2V), vehicle to infrastructure (V2I), Vehicle-to-everything (V2X) communication, vehicle operator input, and other immediate data. The object map may include dynamic objects and detected objects proximate to the host vehicle, such as other vehicles, pedestrians, cyclists, traffic barriers and other obstacles. The object map may be further operative to include detected static objects, such as buildings, curbs, roadway center dividers and the like which may be used to correlate the object map with a high definition map data stored in a memory.

The method may next be operative for receiving 520 a map data corresponding to the area proximate to the host vehicle. The map data may be high definition map data indicative of roadway and lane locations, intersections, entrance and exit locations, physical elevations, and other static information. The map data may be received from a memory integral to the host vehicle or may be received via a wireless network connections and stored in the memory.

The method is next operative for generating 530 a current lane score and a proximate lane score in response to the object map and the map data. The current lane score and the adjacent lane score may be generated in response to a completion of a lane change operation, in response to a user vehicle speed selection, in response to a detection of a slower moving preceding vehicle in a current lane or in response to a lane change request received a user input or an ADAS algorithm. In an exemplary embodiment, the current lane score and the adjacent lane score may be generated in response to a user generated lane change request received via a turn signal indicator. In an exemplary embodiment, the current lane score and the adjacent lane score are generated in response to at least one of a lane observed speed, a density of roadway entrances and exits, a density of traffic observed in the current lane, a driver set speed, a navigational route, and a driver preferred lane.

The method is next operative for generating 540 a lane change control signal in response to the adjacent lane score exceeding the current lane score. For example, the lane change control signal may be generated in response to the adjacent lane score exceeding the current lane score by a threshold value, such as ten percent. In one exemplary embodiment, the lane change control signal may be generated in response to a time duration since a prior lane change operation exceeding a threshold time duration. The method may then be operative for performing 550 a lane change operation from a current lane to an adjacent lane in response to the lane change control signal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor configured for determining a first distance to a first proximate vehicle and a second distance to a second proximate vehicle;
   a user input operative to receive a user preference;
   a memory operative to store a map data;
   a processor operative to initiate a generation of a current lane score and an adjacent lane score in response to a completion of a first lane change operation and wherein the current lane score and the adjacent lane score are generated in response to the first distance to the first proximate vehicle, the second distance to the second proximate vehicle, the user preference, and the map data, the processor being further operative to generate a second lane change control signal in response to the adjacent lane score exceeding the current lane score; and
   a vehicle controller operative to perform a second lane change operation from a current lane to an adjacent lane in response to the second lane change control signal.

2. The apparatus of claim 1 wherein the processor is further operative to generate the second lane change control signal in response to the adjacent lane score exceeding the current lane score by a threshold value.

3. The apparatus of claim 1 wherein the processor is further operative to generate the second lane change control signal in response to a time duration since a prior lane change operation exceeding a threshold time duration.

4. The apparatus of claim 1 wherein the processor is operative to determine an optimal cruising lane in response to a difference between the current lane score and the adjacent lane score.

5. The apparatus of claim 1 wherein the user preference is a vehicle speed.

6. The apparatus of claim 1 wherein the processor is operative to generate the current lane score and the adjacent lane score in response to a detection of a slower moving preceding vehicle in the current lane.

7. The apparatus of claim 1 wherein the processor is operative to generate the current lane score and the adjacent lane score in response to a lane change request received via the user input.

8. The apparatus of claim 1 wherein the processor is operative to generate the current lane score and the adjacent lane score in response to a lane change request received via an ADAS algorithm.

9. A method performed by a processor comprising:
   generating an object map of an area proximate to a host vehicle;
   receiving a map data corresponding to the area proximate to the host vehicle;
   performing a first lane change operation to a current lane;
   generating a current lane score and an adjacent lane score in response to a completion of the first lane change operation, the object map and the map data;
   generating a lane change control signal in response to the adjacent lane score exceeding the current lane score; and
   performing a second lane change operation from the current lane to an adjacent lane in response to the lane change control signal.

10. The method of claim 9 wherein the lane change control signal is generated in response to the adjacent lane score exceeding the current lane score by a threshold value.

11. The method of claim 9 wherein the lane change control signal is generated in response to a time duration since the first lane change operation exceeding a threshold time duration.

12. The method of claim 9 wherein an optimal cruising lane is determined in response to the current lane score and the adjacent lane.

13. The method of claim 9 wherein the current lane score and the adjacent lane score are generated in response to a user vehicle speed selection.

14. The method of claim 9 wherein the current lane score and the adjacent lane score are generated in response to a detection of a slower moving preceding vehicle in the current lane.

15. The method of claim 9 wherein the current lane score and the adjacent lane score are generated in response to a lane change request received via a user input.

16. The method of claim 9 wherein the current lane score and the adjacent lane score are generated in response to a lane change request received via an ADAS algorithm.

17. The method of claim 9 wherein the current lane score and the adjacent lane score are generated in response to a user generated lane change request.

18. The method of claim 9 wherein the current lane score and the adjacent lane score are generated in response to at least one of a lane observed speed, a density of roadway entrances and exits, a density of traffic observed in the current lane, a driver set speed, a navigational route, and a driver preferred lane.

19. An advanced driver assistance system for controlling a host vehicle comprising:
- an input for receiving a request to determine an optimal cruising lane in response to a first lane change operation to a current lane;
- a processor operative to generate a current lane score and an adjacent lane score in response to the input, wherein the current lane score and the adjacent lane score are determined in response to an object map of an area proximate to the host vehicle and a map data of the area proximate to the host vehicle, and for generating a lane change control signal in response to the adjacent lane score exceeding the current lane score; and
- a vehicle controller for performing a second lane change operation from the current lane to an adjacent lane in response to the lane change control signal.

20. The advanced driver assistance system for controlling the host vehicle of claim 19 wherein the optimal cruising lane is determined in response to the current lane score and the adjacent lane score, and wherein the current lane score and the adjacent lane score are generated in response to at least one of a lane observed speed, a density of roadway entrances and exits, a density of traffic observed in the current lane, a driver set speed, a navigational route, and a driver preferred lane.

* * * * *